United States Patent [19]

Baldwin et al.

[11] 4,252,608

[45] Feb. 24, 1981

[54] GENERATING END PLUG POTENTIALS IN TANDEM MIRROR PLASMA CONFINEMENT BY HEATING THERMAL PARTICLES SO AS TO ESCAPE LOW DENSITY END STOPPERING PLASMAS

[75] Inventors: David E. Baldwin; B. Grant Logan, both of Danville, Calif.

[73] Assignee: The United States of America as represented by the United States Department of Energy, Washington, D.C.

[21] Appl. No.: 21,293

[22] Filed: Mar. 16, 1979

[51] Int. Cl.[3] .............................................. G21B 1/00
[52] U.S. Cl. ........................................... 176/3; 176/5
[58] Field of Search ................................. 176/1, 3, 5, 7

[56] References Cited

U.S. PATENT DOCUMENTS

| | | | |
|---|---|---|---|
| 3,170,841 | 7/1954 | Post | 176/3 |
| 3,668,067 | 10/1969 | Christofilos | 176/5 |
| 3,728,217 | 6/1972 | Dandl | 176/3 |
| 4,125,431 | 11/1978 | Fowler | 176/5 |
| 4,127,442 | 11/1978 | Logan | 176/5 |
| 4,166,760 | 7/1979 | Fowler et al. | 176/5 |

OTHER PUBLICATIONS

UCRL-79092, Summary, (1977), Carlson.
Plasma Physics 9, 503, (1967), Kelley.
"Suppression of Ion Cyclotron Instability in Phoenix II Using Electron Transit Time Heating," E. Thompson et al., 10th Ann. Meeting APS, Division of Plasma Physics, (11/68), Miami.

*Primary Examiner*—S. A. Cangialosi
*Attorney, Agent, or Firm*—James E. Denny; Roger S. Gaither; P. Martin Simpson, Jr.

[57] ABSTRACT

The invention provides a method and apparatus for raising the potential of a magnetic mirror cell by pumping charged particles of the opposite sign of the potential desired out of the mirror cell through excitation, with the pumping being done by an externally imposed field at the bounce frequency of the above charged particles. These pumped simple mirror cells then provide end stoppering for a center mirror cell for the tandem mirror plasma confinement apparatus. For the substantially complete pumping case, the end plugs of a tandem mirror can be up to two orders of magnitude lower in density for confining a given center mirror cell plasma than in the case of end plugs without pumping. As a result the decrease in recirculating power required to keep the system going, the technological state of the art required, and the capital cost are all greatly lowered.

18 Claims, 24 Drawing Figures

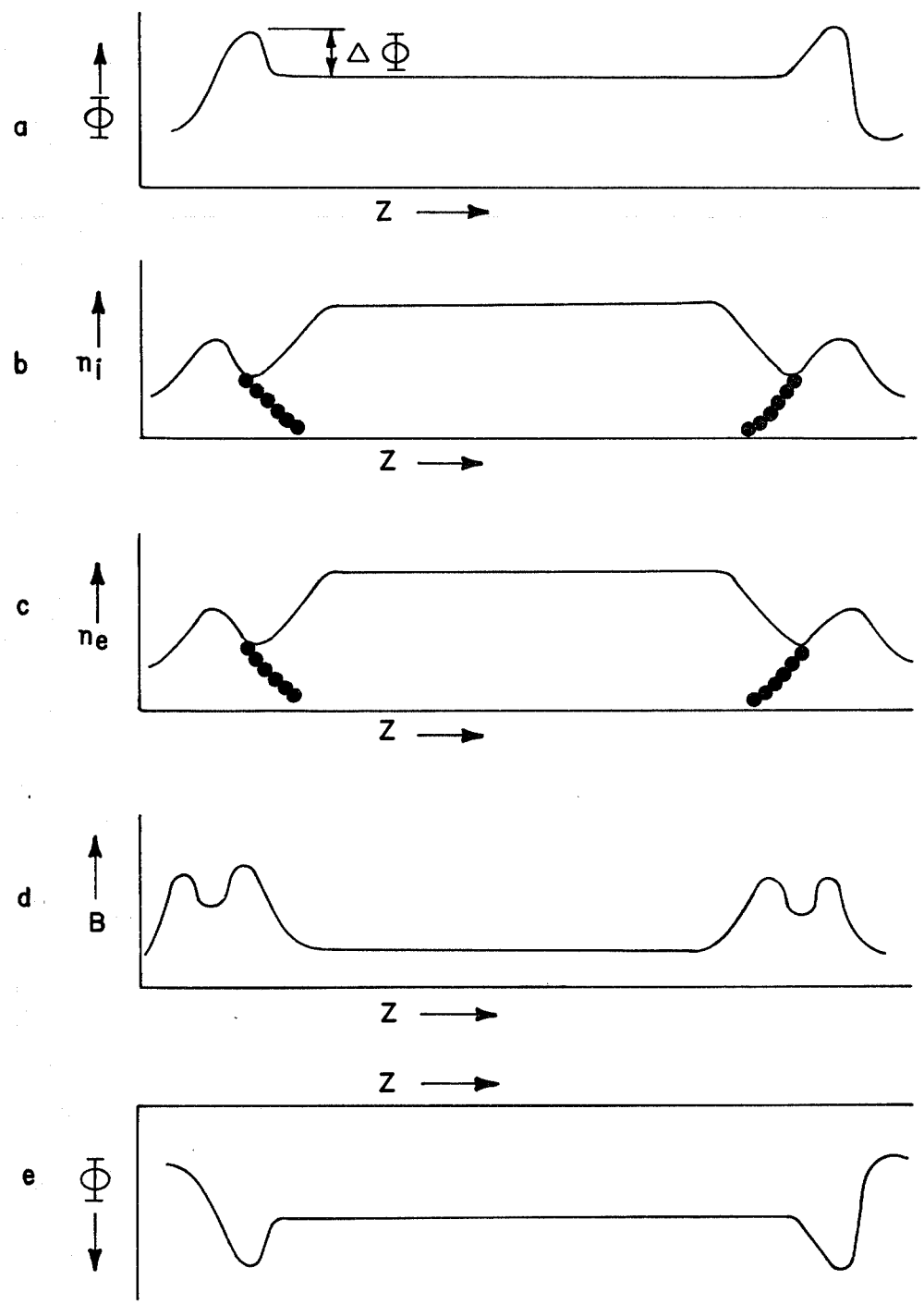
Fig. 3 (a THRU e)

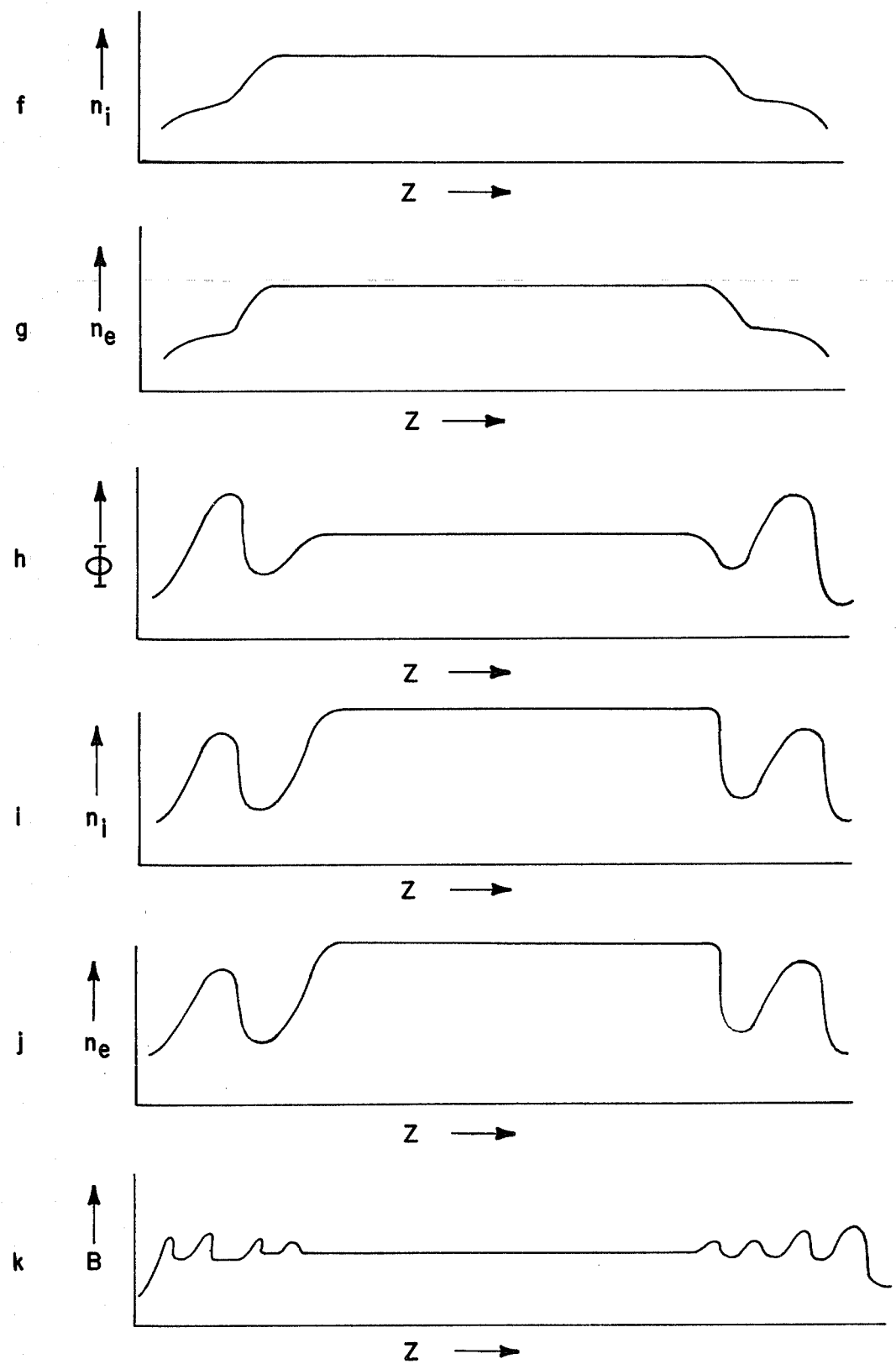
Fig.3 (f THRU g)

GENERATING END PLUG POTENTIALS IN TANDEM MIRROR PLASMA CONFINEMENT BY HEATING THERMAL PARTICLES SO AS TO ESCAPE LOW DENSITY END STOPPERING PLASMAS

The invention described herein was made in the course of, or under, Contract W-7405-ENG-48 with the United States Department of Energy.

BACKGROUND OF THE INVENTION

This invention pertains to the confinement of plasmas by magnetic fields. More particularly, the invention is directed to a major advance for open-ended magnetic confinement devices.

Apparatus employed for the containment of plasmas by magnetic fields may utilize many varied configurations. Two well-known categories of these machines are the open-ended type, such as the magnetic mirror, and the toroidal type, such as the tokamak and the stellarator. One advantage to the toroidal type is that a trapped charged particle must move laterally across magnetic field lines to escape confinement. Hereinafter, positive ions will be designated simply as "ions." Since the ions tend to remain in a spiral orbit about a given set of magnetic field lines, the continuity of the magnetic field lines inside the apparatus enhances containment.

An apparatus of the open-ended type has the disadvantage that the trapped charged particles may escape while traveling along the magnetic field lines which define their spiral orbits. The magnetic field lines do not close upon themselves inside the simple magnetic mirror. Some, but not all, ions are reflected by an increased magnetic field strength at the mirror throat. As a result, the simple magnetic mirror suffers large plasma losses through the mirror ends. The net positive potential of the confined plasma adds to the losses since ions are confined better than electrons in a simple magnetic mirror. One early mirror confinement apparatus is disclosed in Post, U.S. Pat. No. 3,170,841, filed on July 14, 1954. Post is hereby incorporated by reference. The physics of a simple magnetic mirror is discussed at length in the Post patent as well as in Samuel Glasstone and Ralph H. Loveberg, Chapter 9, "Magnetic Mirror Systems," *Controlled Thermonuclear Reactions,* D. Van Nostrand Co., Inc., Princeton, N.J. (1960), p. 336 et seq and in David J. Rose and Melville Clark, Chaper 10, "Motion of Individual Charges," *Plasmas and Controlled Fusion,* John Wiley & Son, Inc., New York (1961) p. 198 et seq.

The problem of end losses in magnetic mirrors has been addressed in a number of ways. One approach links several mirrors together to form roughly a toroidal configuration with magnetic field lines closed inside the apparatus. Particles which leak out of one magnetic mirror simply leak into an adjacent magnetic mirror. Post noted this in FIG. 25 of U.S. Pat. No. 3,170,841, supra. Other closed systems of linked magnetic mirrors include Dandl, U.S. Pat. No. 3,728,217. Each magnetic mirror segment is independent of the next, the total effect on the toroidally confined plasma being a stabilization due to the bumpy nature of the toroidal magnetic field together with disks of hot electrons spaced in mirror cells around the toroidal plasma. These electrons are heated by microwave radiation at the election cyclotron resonance frequency. In either patent there is no teaching of electrostatic plugging of adjacent mirror cells. The same may be said for other linked mirror systems such as the Christofilos, U.S. Pat. No. 3,668,067. In both Dandl and Christofilos, the linked magnetic mirrors are secondary to the stabilization and confinement of the plasma, which is by means other than by electrostatic plugs.

In linked three-cell systems, the earliest prior art appears in FIG. 22 of Post, U.S. Pat. No. 3,170,841. However, Post's three-cell system does not operate as three cells simultaneously. The end cells exist as thermonuclear reaction zones alternately and do not serve to electrostatically stopper the central cell.

A three-mirror system to change the potential at the linking magnetic mirrors is suggested by G. G. Kelley, Plasma Physics 9, 503 (1967). Since electrons travel more freely through the mirroring regions than ions, the mirroring regions have a net negative charge. Thus, ions which would have mirrored are drawn deeper into the mirroring region, and some are lost. To overcome this enhanced end loss, Kelley injected cold neutral species into the mirroring regions of the center mirror cell of a three mirror cell system. The cold neutral species ionize; thus, these mirroring regions substantially lose their negative potential. Kelley did not try to make the end mirror cells electrostatic end plugs to stop end losses in the center mirror cell. He addressed a problem of enhanced end losses without touching on the basic end-loss problem in an open-ended system.

The use of magnetic mirror cell plasmas to end stopper ions in a center mirror cell is disclosed in U.S. Pat. No. 4,125,431 issued Nov. 14, 1978, to T. Kenneth Fowler. Also different modes of start up procedures for mirror cells and designs of current-carrying coils for mirror cells are described for the Fowler three mirror cell system. The electrons are free to travel in each of the three mirror cells, thus effectively giving rise to one electron temperature. Electrons from the hotter plasma of the end mirror cells heat the center mirror cell, which thus increases the number of ions with the energy for escape from the potential well formed by the end mirror cells. One method of easing this problem by using charge exchange cooling is disclosed in U.S. Pat. No. 4,127,442 which issued Nov. 28, 1978, to B. Grant Logan. However, the density and energy of the end mirror cell plasmas must be kept higher than in the center mirror cell to achieve the end stoppering. As the energy of ions to be confined in the center mirror cell goes up, the required density and energy for end stoppering by the end mirror cells increase even more. Thus, for a reference design tandem mirror with 30 keV center mirror cell plasma, the end mirror cell mean ion energy is 880 keV maintained by 1.2 MeV neutral beam injectors in a 16.5 tesla mid-plane magnetic field. (See Lawrence Livermore Laboratory Report UCRL-79092 Summary, available at the National Technical Information Service). Such high neutral beam injector energies and intense magnetic fields create a problem in capital cost and energy used to maintain the plasma confinement.

The abstract "Suppression of the Ion Cyclotron Instability in Phoenix II Using Electron Transit Time Heating" by E. Thompson, et al, in the American Physical Society Tenth Annual Meeting of the Division of Plasma Physics on Nov. 13–16, 1968, at Miami discloses heating of mirror cell electrons by rf fields at the electron transit time frequency. Thompson et al was able to suppress some instabilities. They did not note a change in mirror cell potential as a result of this heating.

Thus, the ion end losses have been solved for open ended systems by Fowler's use of mirror cell plasmas to end stopper each end of a center mirror cell. No other part of the art taught end stoppering by use of plasmas. Yet, the small intense end mirror cells of Fowler's tandem mirror are classical mirror cells with end losses of ions and electrons. For electrostatic end stoppering, the demands on the end mirror cells rise greatly with the energy of the ions to be confined in the center mirror cell. An excellent example of where these demands rise greatly with the energy of the ions is shown above for 1.2 MeV neutral beam injectors at the sixteen and one-half tesla end mirror cells confining a center mirror cell plasma of 30 keV. The tandem mirror improved the position of mirror cell systems with respect to toroidal plasma confinement, but the energy expended and capital cost incurred for a 30 keV center mirror cell plasma still leaves great room for improvement in open-ended magnetic confinement and many of these problems had not been improved upon until the applicants' invention described herein.

SUMMARY OF THE INVENTION

The present invention is directed to a pumping mechanism for altering the potential of a simple or classical mirror cell where the now altered potential of the mirror cell is used to electrostatically inhibit leakage of another plasma from a plasma confinement device.

The present invention provides method and apparatus for confining a plasma in a center mirror cell by use of electrostatic end stoppering of charged particles in a center mirror cell by pumped plasmas in end mirror cells. The pumped plasmas in the end mirror cells enhance their potential difference from the center mirror cell plasma by a pumping mechanism which pumps out of the end cell some of the charged particles of the opposite sign as those to be end stoppered in the center mirror cell. The pumping mechanism in an end mirror cell may be a pulsed magnetic field at a frequency to match the bounce frequency of the charged particle to be ejected from the end mirror cell. Another way of pumping to add energy to a trapped charged particle in an end mirror cell is the application of an electric field by an induction coil. The great benefit of using pumping to enhance the potential difference between the end mirror cells and the center mirror cell is that the density requirements for the end mirror cells are greatly reduced, even to the point of lowering the plasma density of the end mirror cells below the plasma density of the center mirror cell; something not herebefore thought possible or practical. For the case of pumping substantially all thermal charged particles from an end plug, and for confinement of a given center mirror cell plasma, the end plug plasma density can be fully two orders of magnitude lower than for the case without pumping. The tandem mirror without pumping requires the energy drain and capital costs of maintaining the end mirror cell plasma more dense than center mirror cell plasma. The three specific configurations of mirror cells include positive end mirror cells with respect to the center mirror cell; negative end mirror cells with respect to the center mirror cell; and both positive mirror cells and negative mirror cells on each end of a center mirror cell.

One object of the present invention is to provide a mirror apparatus for plasma confinement with electrostatic end stoppering of a center mirror cell by end mirror cell plasmas, with the end stoppering being enhanced by pumping out of the end mirror cell those charged particles of the sign not to be end stoppered, thereby enhancing the end stoppering potential.

Another object of the present invention is to end stopper a center mirror cell plasma with end mirror cell plasmas, which plasmas are not of a higher density than the center mirror cell, as required before this invention, but are only as dense or less dense than the center mirror cell plasma.

Another object of the present invention is to reduce the density of the end mirror cell plasmas needed to end stopper a center mirror cell plasma. This objective can be accomplished by use of both a positive end mirror cell plasma and a negative end mirror cell plasma on each end of a center mirror cell, with the negative mirror cell plasma serving to keep the electrons of the positive end mirror cell plasma separate from electrons of the center mirror cell, and further with the potential of the negative end mirror cell plasma being enhanced by pumping positively charged particles out of the negative end mirror cell plasma.

Another object of the present invention is to reduce neutral beam injection power required to maintain confinement of a center mirror cell plasma end stoppered by end mirror cell plasmas.

Another object of the present invention is to reduce the magnetic field strength required to contain an end mirror cell plasma, which plasma had been used to end stopper a given plasma in a center mirror cell.

Another object of the present invention is to reduce the density of end mirror cell plasma needed to end stopper a given center mirror cell and simultaneously to add to the magnetohydrodynamic stability of the end mirror cells.

Another object of the present invention is to enhance confinement of a plasma through the use of an enhanced electrostatic potential on a separate plasma different from the plasma to be confined. The separate plasma is positioned across magnetic field lines with the potential of the separate plasma being enhanced by bounce mode frequency pumping.

BRIEF DESCRIPTION OF DRAWINGS

FIG. 7 is a perspective view of the current-carrying coil and neutral beam locations for the FIG. 6 embodiment with the schematic of FIG. 1a.

DESCRIPTION OF THE PREFERRED EMBODIMENTS

A mirror apparatus for confining a plasma suffers from the loss of plasma which does not mirror in a mirroring region of the magnetic field. A mirroring region is a region in which a charged particle experiences an increasing magnetic field strength as it translates along an axis aligned roughly parallel with the local magnetic field lines. As the charged particle moves, the magnetic field grows to such a strength that substantially all of the energy of the charged particle is converted to orbital energy about the axis. If the axial component of kinetic energy of the charged particle is too large, the magnetic field cannot fully convert this energy to orbital energy, and the charged particle leaks out. With two mirroring regions spaced apart along magnetic field lines, a mirror cell is formed, and a charged particle may be trapped between the two mirroring regions.

In view of the importance of the disclosures of the specification of both U.S. Pat. No. 3,728,217 to Dandl and No. 4,125,431 to Fowler each patent is hereby incorporated by reference. The following description may be read closely with each of these patents.

Figure 1A:
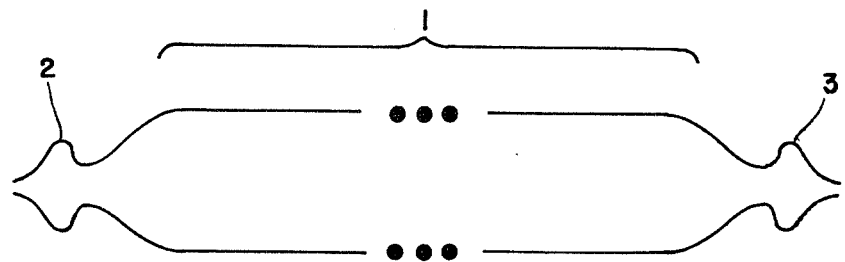
FIG. 1a is a schematic cross section of the plasma in a three mirror cell tandem mirror, with or without the invention.
Figure 1B:
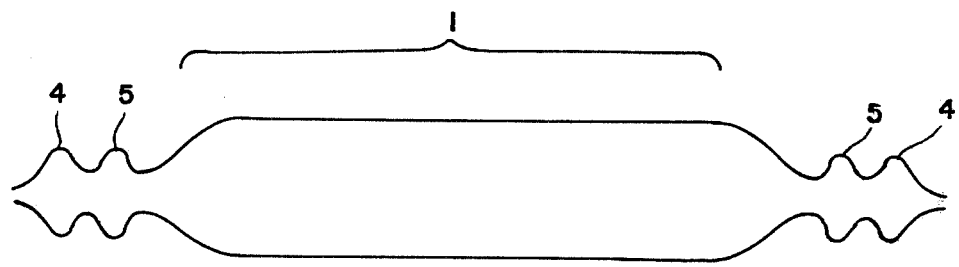
FIG. 1b is a schematic cross section of the plasma in a five mirror cell tandem mirror, designed for use with the invention.

FIGS. 1a and 1b are schematics of the tandem mirror concept. FIG. 1a shows the three mirror cell embodiment and FIG. 1b illustrates the five mirror cell embodiment. A center mirror cell 1 is linked along continuous magnetic field lines beyond one mirroring region to a first end mirror cell 2 and beyond the other mirroring region to a second end mirror cell 3 of FIG. 1a. Each mirror cell is viewed substantially as the mirror cell plasmas appear in cross section. FIG. 1b illustrates the five mirror cell tandem mirror wherein the outermost end mirror cells are ion plug mirror cells 4, and wherein an electron plug mirror cell 5 is located between each of the ion plug mirror cells 4 and the center mirror cell 1.

Figure 2:
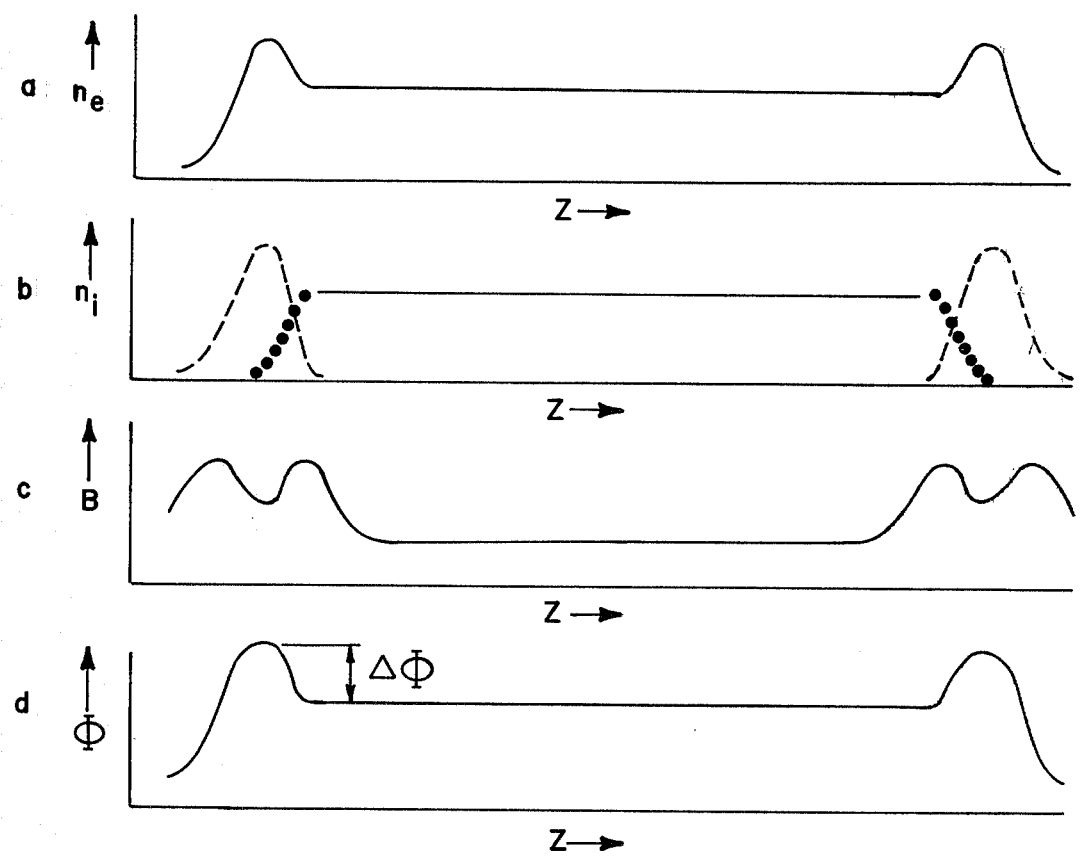
FIG. 2 comprises graphs of the electron number density, $N_e$, ion number density, $N_i$, magnetic field strength, B, and electrostatic potential, $\Phi$, for the schematic of FIG. 1a as a tandem mirror without the present invention.

FIG. 2 presents the requirements for electrostatic end stoppering without pumping of charged particles. In FIG. 2a, the electron number density $n_e$ is substantially constant over the center mirror cell and increases in each of the end mirror cells. The same is true for the ion number density $n_i$ displayed in FIG. 2b. The dots represent the declining number density of the ions confined in the center mirror cell while the dashed lines display the number density of the ions in the end mirror cells. FIG. 2c demonstrates that four maxima in magnetic field strength B are required to build the three linked mirror cells. Lastly, FIG. 2d shows the potential well $\Delta\Phi$ created by the net positive charge of the end mirror cell plasmas. To escape through a mirroring region, the ions in the center mirror cell must have kinetic energy great enough to overcome the potential barrier while the ion travels a spiral path along the magnetic field lines.

Figure 3:
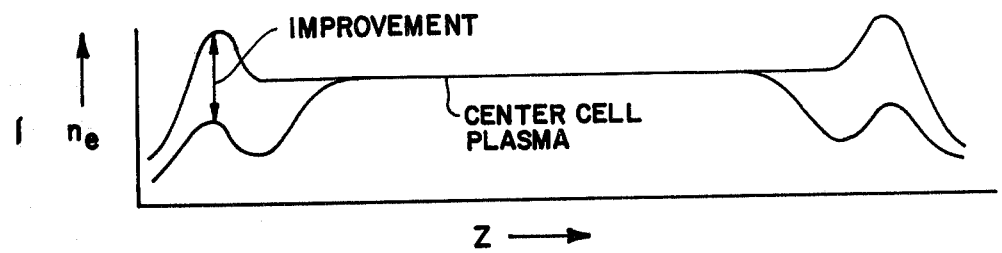
FIGS. 3a–3g comprise graphs of the electron number density, ion number density, magnetic field strength, and electrostatic potentials for the schematics of FIG. 1a with the present invention.
FIGS. 3h–3k comprise graphs of the election number density, ion number density, magnetic field strength, and electrostatic potentials for the schematic of FIG. 1b, with the present invention.
FIG. 3l is a graph showing the improvement of the present invention over a tandem mirror without the invention.

FIG. 3 presents graphs of plasma and magnetic field parameters to practice the claimed invention. As can be seen by a comparison with the corresponding graphs of FIG. 2, the pumping of charged particles reduces the requirements on the end mirror cell plasma. FIG. 3a is similar to the potential distribution of the tandem mirror without pumping using ion plug mirror cells. FIG. 3b represents the positive ion density in the FIG. 3a potential well, and FIG. 3c represents the electron density in the FIG. 3a potential well. FIG. 3d illustrates a magnetic field configuration used for the tandem mirror with one end mirror cell on each end of the tandem mirror.

FIG. 3e shows the potential distribution for a tandem mirror with negative end plugs, one on each end of the center cell. FIG. 3f illustrates the positively charged particle distribution and FIG. 3g illustrates the negatively charged particle distribution, each for the potential distribution of the FIG. 3e embodiment using only negative end plugs. The FIG. 3e magnetic field is generally the same as in FIG. 3d. The FIG. 3h graph illustrates the potential distribution of a tandem mirror with both positively charged end plugs and separate negatively charged end plugs on each end of the center mirror cell with the positively charged mirror cells positioned outermost at each end. FIGS. 3i and 3j display the ion and electron density distributions for the FIG. 3h potential of the FIG. 1b plasma. FIG. 3k represents a magnetic field to yield the plasma of FIG. 1b and potential of FIG. 3h. In each of the FIG. 3 configurations, pumping of charged particles of the opposite sign to those to be end stoppered takes place.

The continuous magnetic field lines between the mirroring regions of a mirror cell may be in many different configurations. A classical mirror cell is formed by magnetic field lines in continuous smooth curves directed outward in the center and then directed inward at each end of the mirror cell to form the mirroring regions. Mirror cells are explained in more detail in Chapter 9 of Glasstone and Loveberg, supra.

Recent work on the Baseball and 2X experiments at Lawrence Livermore Laboratory indicates that plasma confinement is enhanced by using magnetic field lines which are convex as viewed from the axis which runs through the center of both mirroring regions. This continuous curve, with no inflections is possible with a fan-shaped geometry, the spreading of the fan beyond one mirroring region being perpendicular to the spreading of the fan of the magnetic field lines beyond the other mirroring region. If the average value of the magnetic field strength increases in all directions from the center of the mirror cell, then the magnetic field is described as minimum B. For a discussion and references on the 2X Baseball, and related research see the Controlled Thermonuclear Research annual reports for 1974 and 1975 in Lawrence Livermore Laboratory reports UCRL-50002-74 (1974) and UCRL-50002-75 (1975).

Another confinement design, called the solenoid, is comprised of a succession of current-carrying coils, each of which is circular and coaxial with the others.

There may be as few as two current-carrying coils which, if spaced further than a coil radius apart, form a mirror cell. The plane of each current-carrying coil is a maximum of magnetic field strength, a mirroring region. The space between the mirroring regions contains a magnetic field which is a minimum midway between the mirroring regions and which increases as a charged particle moves toward either mirroring region. For current-carrying coils which are spaced apart no more than a coil radius, the mirroring regions may be set up by current-carrying coils at the ends of the solenoid by well-known methods.

To attain a minimum B magnetic field in a solenoid, Ioffe bars may be added. Ioffe bars are a set of linear conductors arrayed evenly spaced in pairs of opposite current direction about the periphery of the solenoid interior. Ioffe bars set up a cusp magnetic field which adds to the interior magnetic field of the solenoid to create a magnetic field strength at a minimum along the axis of the solenoid and on the increase radially outward from the axis of the solenoid. Necessarily, Ioffe bars tend to compress the plasma inside the solenoid.

To smooth the plasma flow between linked mirror cells, an array of field shaping coils may be inserted about the adjoining mirroring regions. The array may include a mixture of current-carrying coils with linear Ioffe bars. Both the current-carrying coils and the Ioffe bars shape the magnetic field lines. This shaping includes compressing or distending the magnetic field lines coming from one mirror cell and going into the next. Current-carrying coils which do this may be called "C" coils. Either "C" coils or Ioffe bars may provide sufficient magnetic field shaping to prevent plasma instabilities.

Plasma instabilities arise at abrupt magnetic field changes. Maintaining the smooth motion of charged particles in a magnetic field has the advantage that a charged particle tends to continue to encircle the same set of magnetic field lines inside the mirror cell. Magnetic field lines which appear concave when viewed from the axis running through the mirroring regions have "bad" curvature. Bad curvature can lead to plasma instabilities, and the ends of a solenoid have bad curvature. However, if the region of bad curvature is not too long compared to the ion Larmor radius, the charged particles tend to pass through the bad curvature region without instabilities developing. Further, the end mirror cells tend to anchor the magnetic field lines so that the magnetic field lines in regions of bad or no curvature do not distort.

The approach of ion end stoppering requires that the end mirror cells develop a sufficient positive potential to confine most of the positively charged particles in the center mirror cell. A balance must exist between density and average energy of the plasmas in the end mirror cells vis-a-vis the plasma in the center mirror cell. The more energetic the negatively charged electrons are, the deeper the potential well set up by the end mirror cell plasmas can be. The denser the end mirror cell plasmas are, the higher the positive potential they develop. Thus, the increased potential electrostatically repels more of the energetic center mirror cell ions.

The proper plasma density and temperature is maintained in the mirror cells of a tandem mirror plasma confinement apparatus through conventional methods in the art for adding energy and possibly plasma to a magnetic mirror cell. Some of these methods are neutral beam injections for adding positively and negatively charged particles at whatever positive ion energy is desired, electron cyclotron resonance heating as in the Elmo Bumpy Torus of U.S. Pat. No. 3,728,217 to Dandl, cross field ion injection, cross field electron injection, plasma streaming along magnetic field lines from beyond the mirror regions into a magnetic mirror cell, gas boxes for plasma addition, pellet injection, and rf heating. There are other methods known in the art. Any one of a combination of the available means for injection of energy and/or plasma can be used to achieve a selection of the FIG. 3 plasma profiles.

The case of ion end stoppering without electron plugs (i.e., FIGS. 3a–3d) provides for confinement similar to the previous tandem mirror plasma confinement apparatus of FIG. 2, except for pumping of thermal electrons, which allows a lower end cell density than without pumping. Since electrons travel freely between the end mirror cells and the center mirror cell and suffer many collisons among themselves before finally escaping, the electron temperature $T_e$ may be taken to be the same in the end mirror cells and in the center mirror cell. The invention maintains dense plasmas in the end mirror cells by continously injecting neutral beams into the end mirror cell plasmas. Positively charged particle losses in the center mirror cell may be replaced by neutral beams, gas or pellets which ionize upon contacting the center mirror cell plasma. The three mirror cells are heated by the neutral beams used to maintain the density of the end mirror cells. Other heating sources may be used, but usually sufficient heating is available by use of neutral beams at an energy level slightly above the energy desired for the positively charged particles in the end mirror cells. The electrons carry a net positive energy from the end mirror cells to the center mirror cell. The average end mirror cell ion energy (i.e., temperature) is much greater than the temperature of the electrons $T_e$, which in turn is greater than the temperature $T_c$ of the positively charged particles in the center mirror cell.

The FIGS. 3d–3g negative end stopper case uses heating methods such as electron cyclotron resonance heating as in Dandl to provide a region of energetic electrons in the negative end stoppers. Also, pumping of positively charged particles provided by ion bounce frequency pulsing of a magnetic field increases the positive ion velocity component parallel to the mirror cell magnetic field. An applied rf field can also be applied to increase energy parallel to the magnetic field. The increase of the velocity component parallel to the magnetic field of the mirror cell plug permits the positively charged particle to pass through the mirroring regions of the plug and either back into the center mirror cell or out of the plasma confinement region. Since, for this case, the positively charged particles are to be thermal, then neutral beams need only supply plasma at energy near the center mirror ion energy. Other forms of supplying plasma include those enumerated above, such as a gas box, streaming plasma along magnetic field lines, and pellet injection (see Fowler, column 6, line 20 to column 7, line 34). Hot electrons from the negative end plugs provide heating to the center mirror cell along with some supplemental electron cyclotron resonance heating (ECRH) if needed for the center mirror cell to reach the temperature desired. More complete details are given in the examples for the TMX apparatus.

The case of substantially complete pumping of particles of the opposite sign from those end stoppered illustrates the significant improvement which pumping gives over end stoppering by classical mirror cells. In a mirror cell, the thermal particles normally have a Maxwell-Boltzman velocity distribution due to collisions. The neutral beam driven end mirror cells of the tandem mirror apparatus as described by the Fowler patent have substantially Maxwell-Boltzman electrons in the end plugs. In the case of energetic electron plugs created by ECRH, for example, it is the thermal ions which are Maxwell-Boltzman. With the addition of a pump for decreasing the end cell thermal particles of the opposite sign to those to be end stoppered, a Maxwell-Boltzman distribution is lost for the thermal particles in that end cell. In the case of substantially complete pumping of thermal particles from the end cells of a tandem mirror, the density of the potential causing energetic charged particles need only be greater than or equal to the density of the particles of the opposite sign escaping through the center mirror cell mirrors into the end mirror cells. Since the streaming density is typically less than or equal to about one-tenth of the density of the center mirror cell, then the energetic-particle density of the end cell need be only about one-tenth or less of the density of the center mirror cell. For the Maxwell-Boltzman end plugs in Fowler, the density of the end plug is on the order of ten times the density of the center mirror cell plasma. Thus, substantially complete pumping of the end mirror cells results in a decrease in end mirror cell plasma density required for confinement of a given center mirror cell plasma by about two orders of magnitude. A two orders of magnitude decrease in end plug density means a great decrease in power requirements for maintaining the end cells including heating and magnetic field levels, in technological demands, and in capital costs of building the apparatus. In the case where pumping end cell thermal particles is not complete, end cell potential is still raised, thus decreasing end cell requirements.

Vacuum means for evacuating the interior of the plasma confinement apparatus are comprised of a state of the art system to reach and maintain vacuums on the order of $10^{-6}$ Torr. Such systems include mercury diffusion pumps, gettering, and cryopanels. A standard reference on vacuum technology is Saul Dushman, *Scientific Foundations of Vacuum Techniques*, 2d Ed., Wiley, New York (1962).

Figure 4:
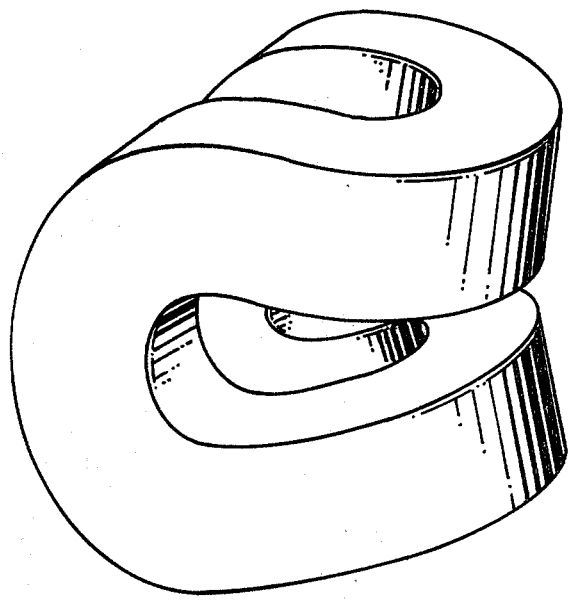
FIG. 4 is a perspective view of a baseball coil geometry for producing a minimum B magnetic field.
Figure 5:
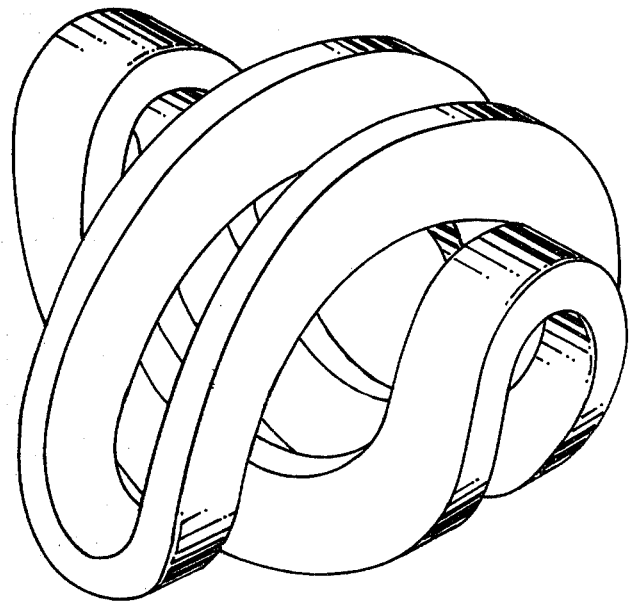
FIG. 5 is a perspective view of a Yin-Yang pair geometry for producing a minimum B magnetic field.

The end mirror cells must provide a magnetic field which will contain a stable plasma. Stable plasmas may be formed for isolated mirror cells by use of a minimum B magnetic field. Such a field is formed either by use of a baseball coil (see FIG. 4), a Yin-Yang pair (see FIG. 5), or circular coils with Ioffe bars. For more information on plasma stabilization, see Fowler, Column 7, line 43 to Column 8, line 2. Another way of forming a stable plasma is to use the electron ring stabilization of the Elmo Bumpy Torus in U.S. Pat. No. 3,728,217 to Dandl. This proven method of stabilization may be used on the end plugs of the present invention. For more information, see Dandl, Column 6, line 9 to Column 7, line 57.

There are several choices of conductors for the current-carrying coils. Superconductors require less power to operate than normal conductors. The solenoid and the array of current-carrying coils for the end mirror cells can be made of superconducting current-carrying coils. If high magnetic field designs close to a plasma are desired, then normal conductors can be used. Such normal conductors can set up a 20 tesla magnetic field which is far beyond the requirements of the present invention. A normal conductor such as copper or aluminum may be used. Such a normal conductor may be cooled, but not necessarily to cryogenic temperatures. A cooling medium may be liquid nitrogen at 77° K. or water. However, aluminum expands and contracts at a different rate from the structural materials (i.e., steel) to be used around the conductor. To avoid an aluminum conductor being put in tension, a liquid metal may be employed as a conductor. Such a liquid metal could be molten aluminum. However, superconductors can set up all the magnetic fields required to practice the present invention with the minimum amount of power and are therefore generally preferred.

The operation of the invention takes place through enhanced end stoppering of a plasma of charged particles traveling along continuous magnetic field lines. A mirror cell plasma is placed across the continuous magnetic field lines at each position to be end stoppered. Plasma and energy are introduced in the mirror cell or cells to set and maintain the end stoppering condition. The pumping of thermal charged particles out of the mirror cell or cells is accomplished by adding a force oriented roughly parallel to the continuous magnetic field lines with the force acting preferentially on the charged particles of a sign opposite to charged particles to be end stoppered. Thus, electrostatic end stoppering is enhanced. For start-up of a mirror cell, plasma and energy must be introduced after a region around the continuous magnetic field lines is volume evacuated by vacuum techniques. Thereafter, a vacuum is maintained. It should be noted that plasma confinement for cusp plasma confinement apparatus and other such devices can be enhanced by placement of such a plasma confined in a region across the continuous magnetic field lines leaving the confinement apparatus. Also, end plugging for positively and for negatively charged particles can be done by use of an ion plug mirror cell and an electron plug mirror cell at each region to be end stoppered, as in FIG. 1b. The electron plugs can be heated to form the rings or disks of electrons using electron cyclotron resonance heating as in Dandl. Electron disks are preferred in order to spread the negative plugging potential across all the magnetic field lines passing through the mirror cell plasma. The pumping can be by electromagnetic radiation or by a pulsed magnetic field, either at the bounce frequency of the particle to be pumped out along the continuous magnetic field lines. Usually, such pumping is preferred to reintroduce the thermal charged particles back into the plasma confinement apparatus it came from, such as the center mirror cell of a tandem mirror. The invention is capable of functioning over a broad range of conditions used to run the arrays of current-carrying coils.

Figure 6:
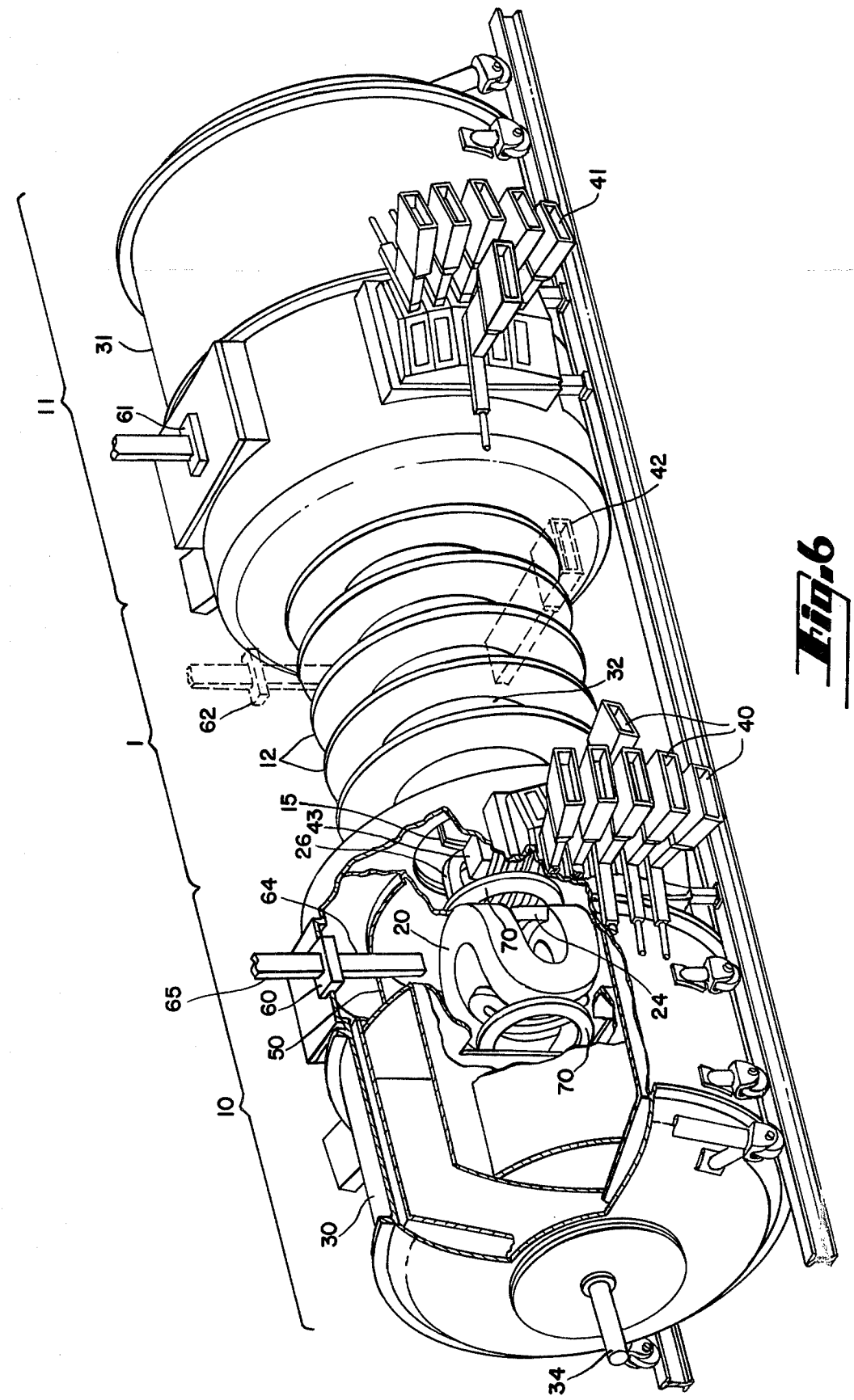
FIG. 6 is a perspective cut-away view of a preferred embodiment of the tandem mirror plasma confinement apparatus capable of providing plasma confinement for a plasma of schematic FIG. 1a or of schematic FIG. 1b, each of which would be with the present invention.
Figure 7:
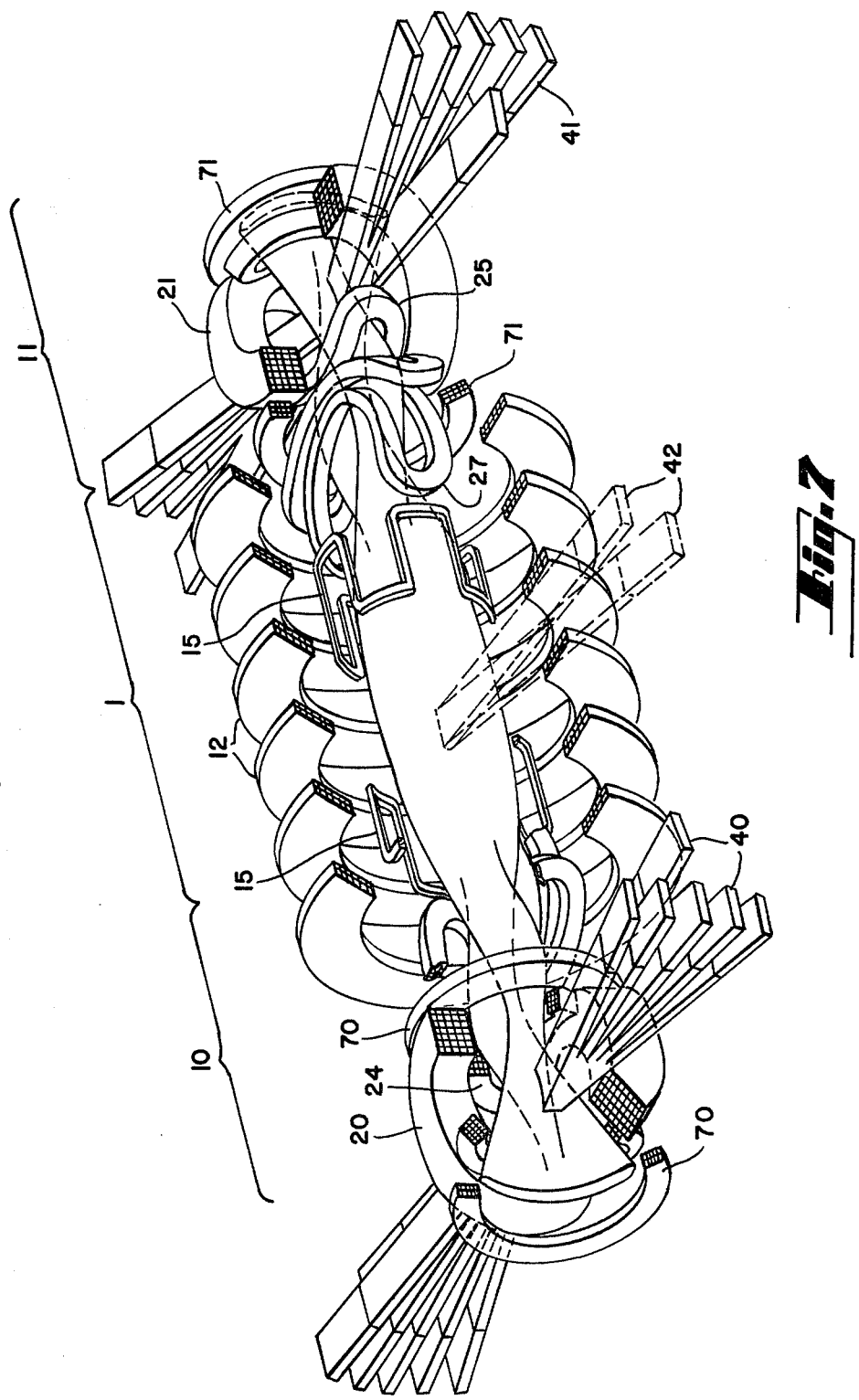

The preferred embodiment is the general design of the Lawrence Livermore Laboratory apparatus for smallscale tandem confinement. As shown in FIGS. 6 and 7, the plasma confinement apparatus comprises three mirror cells. The center mirror cell 1 is positioned between the first end mirror cell 10 and the second end mirror cell 11. The center mirror cell 1 is a solenoid of discrete current-carrying coils 12 with Ioffe bars 15. The Ioffe bars 15 have current in them depending upon the confinement regions being used. If minimum B conditions are needed for stability of the center cell, the current is run through the Ioffe bars. The first end mirror cell 10 contains a current-carrying coil 20 of the baseball geometry. The second end mirror cell 11 contains a current-carrying coil 21 of the baseball geometry. Located next to the adjacent mirroring region (adjacent to the center mirror cell) and between the ends of the current-carrying coil 20 is a first "C" coil 24 which substantially follows the form of the interior sides of the ends of current-carrying coil 20. The first "C" coil 24 completes its coil loop such that the hole in the center is large enough that the first "C" coil does not block flow of the first end mirror cell plasma. A second "C" coil 25 is located likewise between the ends of current-carrying coil 21. The second "C" coil substantially follows the form of the interior sides of the ends of current-carrying coil 21 and does not block the flow of plasma. The third "C" coil 26 and fourth "C" coil 27 further shape the plasma as shown between the elliptical cross section of a baseball coil plasma to a circular cross section of a solenoid.

The first end mirror cell 10 is surrounded by a first end mirror cell vacuum vessel 30, as is the second end mirror cell 11 surrounded by the second end mirror cell vacuum vessel 31. Located past the exterior mirroring region of the first end mirror cell 10 and on the axis running down the center of the three mirror cells is a plasma streaming source. The first target plasma streaming source 34 is mounted to extend through a vacuum sealed port in the first end mirror cell vacuum vessel 30. The second target plasma streaming source (not shown) is similarly mounted through a vacuum sealed port in the second end mirror cell vacuum vessel 31 on axis past the exterior mirroring region of the second end mirror cell 11.

First end mirror cell 10 has the first neutral beam sources 40 arrayed to project their neutral beams toward the center of the first end mirror cell 10. Two groups of six neutral beam sources each are placed radially about the first end mirror cell 10 on each side of a plane passing through the center of the first end mirror cell 2 and perpendicular to the axis running down the center of the three mirror cells. Each of the groups of six neutral beam sources is vertically stacked 5 high and centered about a horizontal line. The sixth source of each group is centered on the horizontal line and on the opposite side of the end mirror cell center plane from the other sources. The second neutral beam sources 41 are arranged similarly about the second end mirror cell 11. Species of neutral particles can be injected into the center mirror cell 1 by neutral beam sources 42 arrayed about a plane running through the center of the center mirror cell. Also, a gas box 43 is shown near the mirroring region between the first end mirror cell and the center mirror cell. A gas box feeds neutral gas under pressure into a region around a plasma. This gas then is ionized by the plasma. For unpumped tandem mirror confinement in the FIG. 6 apparatus, the flow rate is 13 Torr-liters per second for each of two gas boxes.

For the vacuum pumping means, cryopanel surfaces are disposed in first cryopanel box 50 about the first current-carrying coil 20. Holes for the neutral beams and the neutral beam dump are provided in the first cryopanel box sides which are arranged to face the neutral beams in an average perpendicular manner. The cryopanel surfaces are also disposed about the interior of the exterior ends of the first end mirror cell vacuum vessel 30. Cryopanel surfaces are likewise distributed in the second end mirror cell 11 with a second cryopanel box (not shown) about the second current-carrying coil 21. Titanium gettering wire of 3 mm diameter and 85% Ti-15% Ta provides pumping by titanium sublimination on liquid nitrogen cooled cryopanels. Also, three Edwards mercury diffusion pumps are employed to reach the base pressure inside the three connected vacuum vessels of $10^{-8}$ Torr before a plasma confinement run. After a typical plasma confinement run of 25 milliseconds, the end mirror cells are at $10^{-6}$ Torr and the center mirror cell is at $10^{-6}$ Torr.

Sources of neutral atoms are characterized by the flow rate and energy of the neutrals. Each of the four groupings of six neutral beam sources are designed to deliver approximately 155 Torr-liters per second. A standard molecular Torr-liter per second is equal to $3.29 \times 10^{19}$ molecules per second or 5.28 molecular "amperes". In terms of amperes of neutral species, the 40 keV neutral beam sources produce about 40 amperes and the 20 keV neutral beam sources produce about 50 amperes. Each group of six neutral beam sources contains four 20 keV and two 40 keV sources. The neutral beam sources are 3.2 meters from the axis running through the three mirror cells. The vacuum system must be able to handle the gas load from the neutral beam sources and end losses. Gas dumps (not shown) are on the opposite sides of the end mirror cells from each of the groups of six neutral beam sources to pump off the neutrals which are not ionized. Further, gas dumps exist to pump the charged particles which leak out the exterior, mirroring regions of each of the end mirror cells.

The dimensions of baseball coils and associated "C" coils for the end mirror cells are the upper bounds for the size of the end mirror cell plasmas. The baseball coils have a square cross section 30 cm on a side of wound copper square tubing with the stainless steel casing about the windings. The radius of curvature of the baseball coils to the center of the windings is 44 cm. The baseball coil is symmetric with the centers for the radii of curvature 10 cm apart, and each of these nonoverlapping radii of curvature have a center 5 cm from the center of the space enclosed by the baseball coil.

The "C" coils are located between the ends of the baseball coil symmetrically about the axis which runs through the end mirror cell mirroring regions. For the long curved surface of a "C" coil, the radius of curvature is 70 cm, with the center of curvature on the axis through the end mirror cell mirroring regions. This curve continues over a half-angle of 33°, at which point the "C" coil straightens out to form the end curve orthoginal to the direction of the 33° curve. The radius of curvature of the end curve is 15 cm. The "C" coil is wound with copper tubing and is encased in stainless steel for a cross section 15 cm on a side square. The other "C" coils are of similar construction.

The "C" coils encircle the plasma as it passes outside of the baseball coil. The "C" coils shape the plasma which passes between the elliptical cross section of the end mirror cells and the circular cross section of the solenoid. A circular cross section for the plasma leaking out of the exterior mirroring region of each of the end mirror cells spreads out the energy density and number density of the charged particles to be pumped off by the vacuum system. The baseball coils and the "C" coils are supported by numerous tie rods, clamps, and supports to withstand the forces on these current-carrying coils during operation.

Physical dimensions of the preferred embodiment include an overall length from end mirror cell vacuum vessel 30 to end mirror cell vacuum vessel 31 of 14.0 meters. Each end mirror cell vacuum vessel is 5.45 meters long. The length from the center of the center mirror cell 1 to the center of the end mirror cell 10 is 3.2 meters. The same length exists between the centers of center mirror cell 1 and end mirror cell 11. The first and second end mirror cell vacuum vessels are 15 feet in diamter, and the center mirror cell vacuum vessel 32 is 64 inches in diameter.

Operational characteristics of the preferred embodiment include parameters of the magnetic field and plasma. The distance between the adjacent (or interior) mirroring regions of the end mirror cells is 5.5 meters. For each end mirror cell, the distance between exterior and adjacent mirroring regions is 0.9 meters; the magnetic field strength at the center is 1.0 Tesla; the axial mirror ratio is 1.5 to 2.0; the radial mirror ratio is 0.98 to 1.05; the radial well depth is 0.98 to 1.05; the maximum plasma radius is 0.2 meters; the unpumped ion density is $5 \times 10^{13}$ ions/cm$^3$; the unpumped ion temperature is 25 keV; and the unpumped electron temperature is approximately 200 eV. For the center mirror cell, the magnetic field strength in the center is 0.1 to 0.3 Tesla; the maximum plasma radius is 0.6 meters; the unpumped ion density is $1 \times 10^{13}$ ions/cm$^3$; the unpumped ion temperature is 100 eV; and the unpumped electron temperature is 200 eV. Plasma conditions change according to the operating conditions using pumping of charged particles as taught by the present invention. Tables I and II provides plasma values for various operating regimes of the present invention and the above apparatus.

The sources of plasma heating by cyclotron resonance heating are shown at a first cyclotron resonance heating source 60 for the first end mirror cell 10, a second cyclotron resonance heating source 61 for the second end mirror cell 11, and a third cyclotron resonance heating source 62 for the center mirror cell. A first waveguide apparatus 64 is shown for conducting the cyclotron resonance heating from the first cyclotron resonance heating source 60 to the vicinity of the mirror cell plasma. A second waveguide apparatus 65 is shown entering cyclotron resonance heating source 60 from a radiation source not shown. Similar arrangements exist for cyclotron resonance heating sources 61 and 62 according to the teachings of Dandl. Specific frequencies for cyclotron resonance heating are given in Tables I and II for various operating regimes according to the present invention.

The bounce frequency excitation for pumping is added to the end mirror cells by first induction coil set 70 located about the plasma and outside the first baseball coil 20 at each end and a second induction coil set 71 similarly located about the plasma and second baseball coil 21. The coils set up a magnetic field pulsed at a frequency to match the bounce time of the charged particle of the opposite sign to the particles to be end stoppered. This bounce frequency is the time for a charged particle to transit the length of an end mirror cell. The excitation energy may be applied also by electrostatic pumping through the use of electrodes which can be placed where the induction coil set is. Bounce frequency excitation has been shown in practice by the abstract "Suppression of the Ion Cyclotron Instability in Phoenix II Using Electron Transit Time Heating" by E. Thompson et al at the American Physical Society Tenth Annual Meeting—Division of Plasma Physics—Nov. 13-16, 1968, Miami. The object of Thompson et al was suppression of instabilities in Phoenix II at Culham Laboratory, England. Thompson et al added energy to increase the electron velocity component parallel to the mirror cell magnetic field. In the claimed invention, this addition of parallel energy is called pumping since increased charged particle parallel energy can give rise to increased thermal charged particle escape from that magnetic mirror cell. Thus, a particular charged species can be pumped out of a mirror cell by an applied field to add parallel energy to the thermal charged particle species at the bounce frequency of that species. The teaching of externally applied bounce frequency pumping to change the potential of a magnetic mirror cell is unknown in the art previous to this disclosure.

Figure 8:
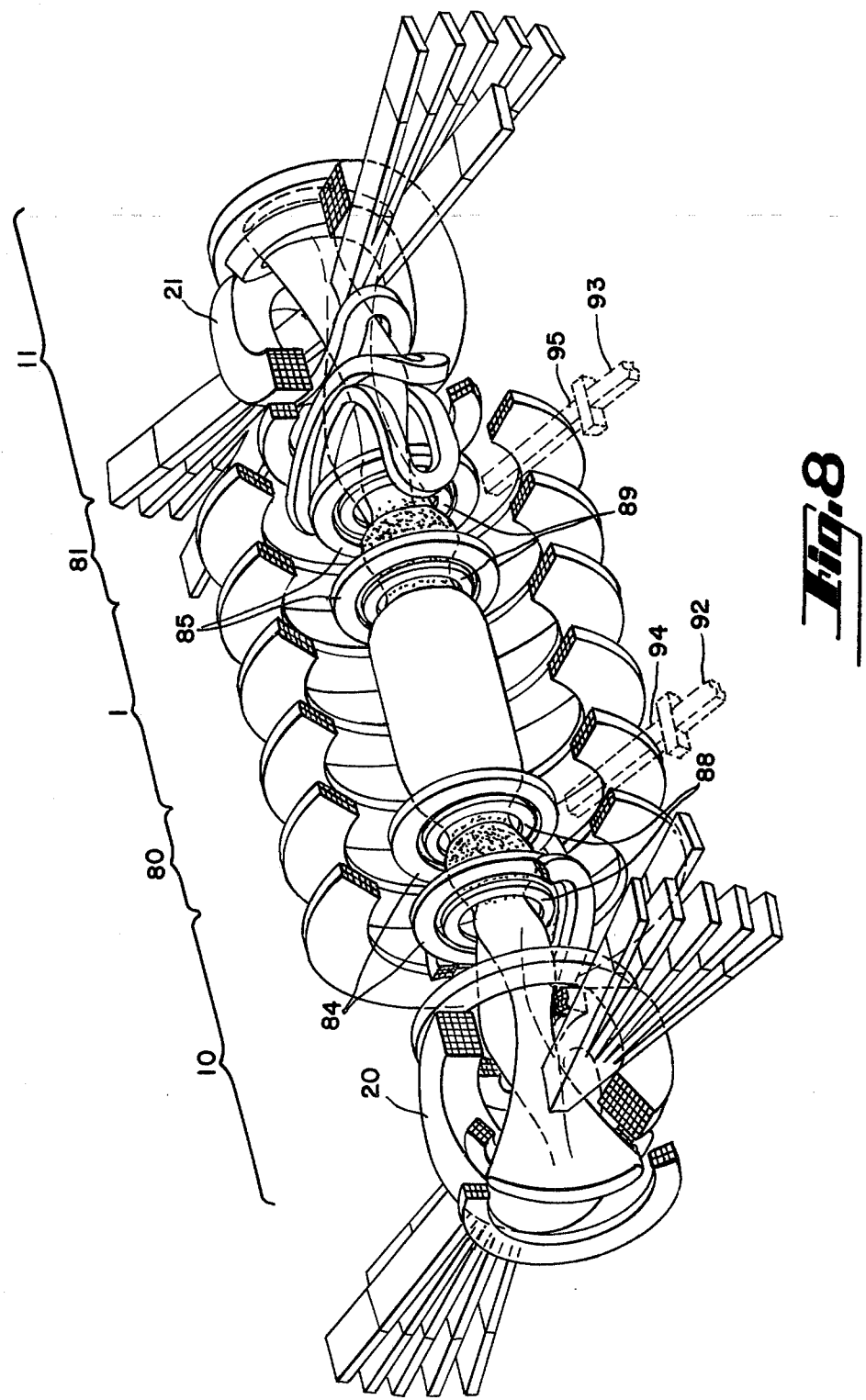
FIG. 8 is a perspective view of the current-carrying coil and neutral beam locations for the FIG. 6 embodiment with the schematic of FIG. 1b.

FIG. 8 is a perspective view of the current-carrying coils, neutral beam and other excitation means associated with the five mirror cell embodiment with the plasma shape of FIG. 1b in the apparatus of FIG. 6. The apparatus of FIG. 6 is altered as shown in FIG. 8 by the addition of four simple circular mirror coils. Two form a mirror cell near the transition region on the center mirror cell side of plasma flowing between the first end mirror cell 10 and the center mirror cell 1. Thus, a first internal plug mirror cell 80 is formed by current-carrying coils 84 with a third induction coil set 88 between the first end mirror cell 10 and the center mirror cell 1. A fourth cyclotron resonance heating source 92 supplies cyclotron resonance heating to the plasma of the first internal plug mirror cell 80. As before, waveguide apparatus 94 carries the cyclotron resonance heating radiation from the cyclotron resonance heating source to the vicinity of the mirror cell plasma to be excited. A similar arrangement holds for a second internal plug cell 81 formed by current-carrying coils 85, excited in bounce mode frequencies by fourth induction coil set 89, and heated at a cyclotron resonance by a fifth cyclotron resonance heating source 93 through waveguide apparatus 95. FIG. 8 merely shows the location of apparatus added for the five mirror cell embodiment and is not intended to exclude apparatus recited for FIGS. 6 and 7. Specific operating parameters for the FIG. 8 embodiment are shown in Tables I and II.

TABLE I

| Parameters | Examples of Large Scale Tandem Mirrors | | | | |
| --- | --- | --- | --- | --- | --- |
| | Unpumped | Complete Pumping | | Partial Pumping | |
| | Ion Plug | Electron Plug | Ion Plug | Electron Plug | Ion Plug |
| Energy of neutral beams injected into the plug, kev; current in A | 1200 kev 200 A/plug | N/A | 150 kev 6 A/plug | N/A | 150 kev 60 A/plug |
| Magnetic field in plug, T | 16 | 2 | 2 | 4 | 4 |
| Ion density in the plug, particles/cm$^3$ | $8.5 \times 10^{14}$ | $2 \times 10^{13}$ | $2 \times 10^{13}$ | $2 \times 10^{14}$ | $2 \times 10^{14}$ |
| Ion density in solenoid particles/cm$^3$ | $1.0 \times 10^{14}$ | $2 \times 10^{14}$ | $2 \times 10^{14}$ | $2 \times 10^{14}$ | $2 \times 10^{14}$ |
| Electron temperature in plug, kev | 43 | 300 | 60 | 300 | 60 |
| Electron temperature | | | | | |

TABLE I-continued

Examples of Large Scale Tandem Mirrors

| Parameters | Unpumped Ion Plug | Complete Pumping | | Partial Pumping | |
|---|---|---|---|---|---|
| | | Electron Plug | Ion Plug | Electron Plug | Ion Plug |
| in solenoid, kev | 43 | 15 | 15 | 15 | 15 |
| Potential barrier for electrons, keV | −260 | −110 | −110 | −110 | −110 |
| Temperature of solenoid ions, keV | 30 | 15 | 15 | 15 | 15 |
| Temperature of plug ion, keV | 880 | 110 | 300 | 110 | 300 |
| Potential barrier for ions, keV | 92 | 60 | 60 | 60 | 60 |
| Magnetic field in the solenoid, T | 2 | 2 | 2 | 2 | 2 |
| Ratio of plasma pressure in the solenoid to magnetic field pressure in the solenoid | 0.7 | 0.7 | 0.7 | 0.7 | 0.7 |
| Length of plasma in the solenoid, m | 100 | 50 | 50 | 50 | 50 |
| Ratio of plasma volume in the solenoid to that in the plugs | 430 | 100 | 100 | 100 | 100 |
| Cyclotron Resonance Heating, Frequency/Power/Species | N/A | 50 GHz 2.5 MW/plug Electrons | N/A | 120 GHz 250 MW/plug Electrons | N/A |
| Bounce Mode Heating Frequency/Power/Species | N/A | 3 MHz 50 kW/plug ions | 180 MHz 50 MW/plug electrons | 3MHz 500 kW/ Plug ions | 180 MHz 250 MW/plug electrons |

TABLE II

Examples of Small Scale Tandem Mirrors

| Parameters | Unpumped Ion Plug | Complete Pumping | | Partial Pumping | |
|---|---|---|---|---|---|
| | | Electron Plug | Ion Plug | Electron Plug | Ion Plug |
| Energy of neutral beams injected into the plug, kev; current in A | 40 keV 90 A/plug | N/A | 40 keV 70 A/plug | 40 keV 2.9 A/ion plug | 40 keV 10 A/plug |
| Magnetic field in plug, T | 1.0 | 1 | 1 | 1T - Ion Plug 1T - Electron Plug | 1 |
| Ion density in the plug, particles/cm$^3$ | $5 \times 10^{13}$ | $2 \times 10^{12}$ | $7 \times 10^{12}$ | $10^{13}$ for ion plug | $7.5 \times 10^{12}$ |
| Ion density in solenoid particles/cm$^3$ | $1.2 \times 10^{13}$ | $10^{13}$ | $10^{13}$ | $10^{13}$ | $10^{13}$ |
| Electron temperature in plug, kev | 0.2 | 500 | 0.2 | 4.4 | 4.7 |
| Electron temperature in solenoid, kev | 0.2 | 2.5 | 0.2 | 2 | 2 |
| Potential barrier for electrons, keV | −1.1 | −19 | −1.4 | −13 | −13 |
| Temperature of solenoid ions, keV | 0.08 | 2.5 | 0.1 | 3 | 3 |
| Temperature of plug ion, keV | 26 | 19 | 26 | 56 | 56 |
| Potential barrier for ions, keV | 0.29 | 10 | 0.4 | 7 | 7 |
| Magnetic field in the solenoid, T | 0.05 | 0.2 | 0.05 | 0.2 | 0.2 |
| Ratio of plasma pressure in the solenoid to magnetic field pressure in the solenoid | 0.5 | 0.5 | 0.5 | 0.5 | 0.5 |
| Length of plasma in the solenoid, m | 5.5 | 5.5 | 5.5 | 5.5 | 5.5 |
| Ratio of plasma volume in the solenoid to that in the plugs | 570 | 140 | 570 | 140 | 140 |
| Cyclotron Resonance Heating, Frequency/Power/Species | N/A | 28 GHz 0.8KW Electrons | N/A | 28 GHz 1.8 kW Electron Plug | N/A |
| Bounce Mode Heating Frequency/Power/Species | N/A | 3.5 MHz 28 W/plug deuterium | 30 MHz 36 kW/plug electrons | 3.5 MHz 0.8 kW/ electron plug | 126 MHz 8 kW/plug electrons |

Figure 9:
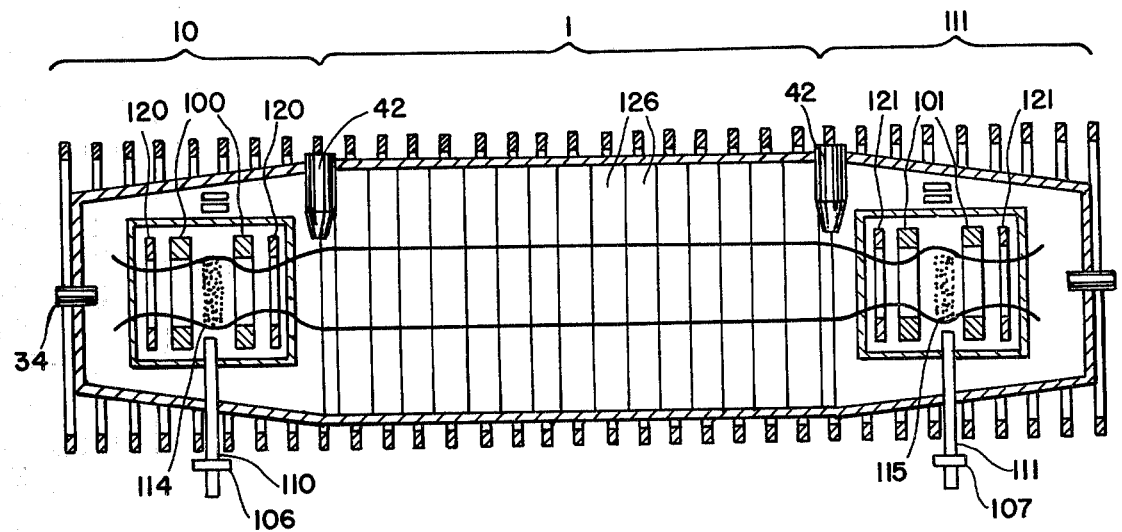
FIG. 9 is a side view of a first alternative embodiment of the tandem mirror plasma confinement apparatus using the three mirror cell schematic cross section of FIG. 1a with simple mirror coils accompanied by the present invention for the end mirror cells and a plurality of modular sections comprising the center mirror cell.

FIG. 9 is a side view of an alternative embodiment using the three mirror cell configuration of FIG. 1a with all mirroring regions set up by simple circular coils and with the center mirror cell comprised of a plurality of substantially similar modular sections. The end mirror cell circular coils are replacements for the minimum B current-carrying coils 20 and 21 in previous embodiments, shown in FIGS. 6, 7, and 8. MHD stability comes from the electron ring. Simple end mirror current-carrying coils 100 set up the mirror field for the first end mirror cell 10 and likewise simple end mirror current-carrying coils 101 set up the mirror field for the second end mirror cell 11. Cyclotron resonance heating sources 106 and 107 supply the cyclotron resonance heating for end mirror cells 10 and 11, respectively, through waveguide apparatus 110 and 111, respectively. This resonance heating sets up disks 114 and 115 of resonately heating charged particles, as in Dandl for MHD stability, in end mirror cells 10 and 11, respectively. Bounce excitation is set up by a fifth inductor coil at 120 for the first end mirror cells 10 and a sixth inductor coil set 121 for the second end mirror cell 11. The center mirror cell is comprised of substantially identical modular sections 126. Thus, the center cell can be as long as desired by adding or taking out the modular sections. Such flexibility adds greatly to the ease of speciality tailoring of the apparatus with standardized end plugs.

The tandem mirror plasma confinement apparatus is of recognized utility as shown by U.S. Pat. No. 4,125,431 issued Nov. 14, 1978, to T. Kenneth Fowler. The TMX apparatus at Lawrence Livermore Laboratory can produce as many neutrons in the pumped mode of operation of the present invention as it can in Fowler's previous unpumped version. Such uses as neutron crystallography, warming a working fluid for other use, and activating switches through neutron detectors are all possible uses among others.

Generating end plug potentials in tandem mirror plasma confinement by heating thermal particles so as to escape low density end stoppering plasmas is a significant advance in the plasma art. For the tandem mirror, the presently claimed invention can, through complete pumping of thermal charged species, reduce the density of end plug mirror cell plasmas by up to two orders of magnitude over the unpumped tandem mirror end cells for a given center mirror cell plasma to be confined. An invention which greatly decreases the demands on fusion technology for a given plasma reaction product output is extraordinary. The claimed invention brings the confinement of a much broader range of plasmas within the scope of current technology. Further, the recirculating power required by the claimed modifications to maintain tandem mirror confinement of a given center cell plasma is greatly decreased as are magnetic field requirements and associated capital costs. It is believed that the present invention is a major advance in the plasma confinement art.

The invention has been described by way of illustration rather than limitation and it should be apparent that it is equally applicable in other applications and art areas in addition to those described.

We claim:
1. A plasma confinement apparatus comprising:
   a first plasma means for end stoppering electrostatically a central plasma traveling along magnetic field lines, the first means comprising a first plasma confined in a first region across the magnetic field lines, said first plasma comprising first charged particles;
   a second plasma means for end stoppering electrostatically said central plasma traveling along said magnetic field lines with said magnetic field lines being continuous as they run between and through the first and second plasma means, the second means comprising a second plasma confined in a second region across said magnetic field lines said second plasma comprising second charged particles;
   a center mirror cell positioned between the first plasma means and the second plasma means so as to enclose those of the magnetic field lines running between and through both the first and second plasma means with said central plasma traveling along said magnetic field lines in the center mirror cell, and comprising central charged particles;
   a first means for introducing both energy and a first input plasma into the first plasma means so as to maintain energy and density conditions in the first plasma which is used for end stoppering the center mirror cell;
   a second means for introducing both energy and a second input plasma into the second plasma means so as to maintain energy and density conditions in the second plasma which is used for end stoppering the center mirror cell;
   a first pumping means for pumping at least some of said first charged particles out of the first region along the magnetic field lines, with these first charged particles undergoing pumping being of a charge sign opposite to that of the central charged particles to be end stoppered within the center mirror cell, and further with the first charged particles undergoing pumping being influenced by a first force acting in a direction roughly parallel to the direction of the magnetic field lines as the lines enter and exit said first region, whereby the pumping enhances the end stoppering by the first plasma means;
   a second pumping means for pumping at least some of said second charged particles out of the second region along the magnetic field lines, with these second charged particles undergoing pumping being of a charge sign opposite to that of the central charged particles to be end stoppered within the center mirror cell, and further with the second charged particles undergoing pumping being influenced by a force acting in a direction roughly parallel to the direction of the magnetic field lines as the field lines enter and exit said second region, whereby the pumping enhances the end stoppering by the second plasma means;
   a start-up means for introducing into the plasma confinement apparatus that amount of plasma and energy required for beginning confinement of the central plasma; and
   a vacuum containing means for containing at least the central plasma;
   a volume evacuating means for evacuating the vacuum containing means and maintaining a vacuum therein.

2. The plasma confinement apparatus of claim 1 wherein the first and second plasma means electrostatically repel positively charged particles.

3. The plasma confinement apparatus of claim 1 wherein the first and second plasma means electrostatically repel negatively charged particles.

4. The plasma confinement apparatus of claim 1 wherein the first plasma means includes a first end mirror cell and the second plasma means includes a second end mirror cell.

5. The plasma confinement apparatus of claim 1, wherein the first plasma means includes both a first ion plug mirror cell and a first electron plug mirror cell, each of which is located along the magnetic field lines with the first electron plug mirror cell being located along the magnetic field lines between the first ion plug mirror cell and the center mirror cell.

6. The plasma confinement apparatus of claim 5, wherein the second plasma means includes both a second ion plug mirror cell and a second electron plug mirror cell, each of which is located along the magnetic field lines with the second electron plug mirror cell being located along the magnetic field lines between the second ion plug mirror cell and the center mirror cell.

7. The plasma confinement apparatus of claim 3, wherein both the first and second means for introducing both energy and input plasma each include means for electron cyclotron resonance heating.

8. The plasma confinement apparatus of claim 6, wherein both the first and second means for introducing both energy and input plasma each include means for electron cyclotron resonance heating.

9. The plasma confinement apparatus of claim 1, wherein both the first and second pumping means each include at least one source of electromagnetic radiation at a frequency which substantially matches bounce frequencies of the charged particles to be pumped out of the regions.

10. The plasma confinement apparatus of claim 1, wherein both the first and second pumping means each include a pulsed magnetic field means pulsed to substantially match bounce frequencies of the charged particles to be pumped out of the regions.

11. The plasma confinement apparatus of claim 8, wherein both the first and second pumping means each include at least one source of electromagnetic radiation at a frequency which substantially matches bounce frequencies of the charged particles to be pumped out of the regions.

12. The plasma confinement apparatus of claim 8, wherein both the first and second pumping means each include a pulsed magnetic field means pulsed to substantially match bounce frequencies of the charged particles to be pumped out of the regions.

13. The plasma confinement apparatus of claim 1, wherein the center mirror cell is comprised of similar modular sections, whereby the center mirror cell can be varied in length by a change in number of the similar modular sections.

14. A plasma confinement method comprising: electrostatically confining a central plasma traveling along magnetic field lines, the first means comprising a first plasma confined in a first region across the magnetic field lines, said first plasma comprising first charged particles;

Providing a second plasma means for end stoppering electrostatically said central plasma traveling along said magnetic field lines with said magnetic field lines being continuous as they run between and through the first and second plasma means, the second means comprising a second plasma confined in a second region across said magnetic field lines said second plasma comprising second charged particles;

Positioning a center mirror cell between the first plasma means and the second plasma means so as to enclose those of the magnetic field lines running between and through both the first and second plasma means with said central plasma traveling along said magnetic field lines in the center mirror cell, and comprising central charged particles;

introducing with a first means both energy and a first input plasma into the first plasma means so as to maintain energy and density conditions in the first plasma which is used for end stoppering the center mirror cell;

pumping with a first pumping means at least some of said first charged particles out of the first region along the magnetic field lines, with these first charged particles undergoing pumping being of a charge sign opposite to that of the central charged particles to be end stoppered within the center mirror cell, and further with the first charged particles undergoing pumping being influenced by a first force acting in a direction roughly parallel to the direction of the magnetic field lines as the lines enter and exit said first region, whereby the pumping enhances the end stoppering by the first plasma means;

with a second pumping means some of said second charged particles out of the second region along the magnetic field lines, with these second charged particles undergoing pumping being of a charge sign opposite to that of the central charged particles to be end stoppered within the center mirror cell, and further with the second charged particles undergoing pumping being influenced by a force acting in a direction roughly parallel to the direction of the magnetic field lines as the field lines enter and exit said second region, whereby the pumping enhances the end stoppering by the second plasma means;

introducing into the plasma confinement apparatus that amount of plasma and energy required for beginning confinement of the central plasma with a start-up means and;

containing at least the central plasma in a vacuum containing means evacuating the vacuum containing means and maintaining a vacuum therein.

15. A plasma confinement method as in claim 14, wherein the pumping is accomplished by the step of producing electromagnetic radiation selected at a frequency which substantially matches bounce frequencies of charged particles to be pumped out of at least one mirror cell plasma.

16. A plasma confinement method as in claim 14, wherein the pumping is accomplished by the step of pulsing a magnetic field running through said at least one mirror cell plasma with a pulse frequency substantially matching bounce frequencies of charged particles to be pumped out of at least one mirror cell plasma.

17. A plasma confinement method as in claim 14, wherein the step of introducing plasma and energy into said at least one mirror plasma includes providing heating near an electron cyclotron resonance frequency.

18. A plasma confinement method as in claim 14, wherein the step of end stoppering includes end stoppering both ions and electrons by means of providing two mirror cell plasmas at each position to be end stoppered, one mirror cell plasma being positively charged and the other mirror cell plasma being negatively charged with respect to the plasma traveling along the continuous magnetic field lines to be end stoppered.

* * * * *